US009781041B2

(12) United States Patent
Jain

(10) Patent No.: US 9,781,041 B2
(45) Date of Patent: Oct. 3, 2017

(54) SYSTEMS AND METHODS FOR NATIVE NETWORK INTERFACE CONTROLLER (NIC) TEAMING LOAD BALANCING

(71) Applicant: Nitin K. Jain, Saharanpur (IN)

(72) Inventor: Nitin K. Jain, Saharanpur (IN)

(73) Assignee: Dell Products LP, Round Rock, TX (US)

( * ) Notice: Subject to any disclaimer, the term of this patent is extended or adjusted under 35 U.S.C. 154(b) by 414 days.

(21) Appl. No.: 13/949,967

(22) Filed: Jul. 24, 2013

(65) Prior Publication Data

US 2015/0029848 A1    Jan. 29, 2015

(51) Int. Cl.
*G01R 31/08* (2006.01)
*H04L 12/803* (2013.01)
*H04L 12/863* (2013.01)

(52) U.S. Cl.
CPC ........ *H04L 47/125* (2013.01); *H04L 47/6215* (2013.01)

(58) Field of Classification Search
CPC .................. H04L 47/6215; H04L 47/125
See application file for complete search history.

(56) References Cited

U.S. PATENT DOCUMENTS

| 2004/0081090 | A1* | 4/2004 | Hara | H04L 12/5693 370/229 |
| 2004/0252638 | A1* | 12/2004 | Gonzalez | H04L 47/10 370/229 |
| 2006/0104298 | A1* | 5/2006 | McAlpine | H04L 47/10 370/412 |
| 2008/0089338 | A1* | 4/2008 | Campbell | H04L 45/00 370/392 |
| 2009/0222558 | A1* | 9/2009 | Xu | G06F 9/485 709/224 |
| 2009/0238072 | A1* | 9/2009 | Tripathi | H04L 47/10 370/235 |
| 2009/0238189 | A1* | 9/2009 | Tripathi | H04L 45/00 370/395.32 |
| 2009/0292858 | A1* | 11/2009 | Lambeth | H04L 29/12839 711/6 |

(Continued)

OTHER PUBLICATIONS

Wadekar, "DCB Capability Exchange Protocol Base Specification", Data Center Bridging, DCBX Base Protocol Rev. 1.01, Obtained from Internet Jun. 20, 2013, 33 pgs.

(Continued)

*Primary Examiner* — Gregory Sefcheck
*Assistant Examiner* — Jael Ulysse
(74) *Attorney, Agent, or Firm* — Egan, Peterman, Enders & Huston LLP.

(57) ABSTRACT

Systems and methods are provided that may be employed in a network environment to implement load balancing for multi-network interface controller (NIC) teaming applications using pause frame flow control communications received at an information handling system in situations where a given data path through a given NIC of the information handling system and a corresponding network switch is heavily loaded or otherwise congested relative to one or more other more lightly loaded data paths through other NICs of the information handling system and their corresponding network switches.

26 Claims, 6 Drawing Sheets

(56) References Cited

U.S. PATENT DOCUMENTS

| | | | |
|---|---|---|---|
| 2009/0300209 A1* | 12/2009 | Elzur | H04L 47/10 709/234 |
| 2009/0304022 A1* | 12/2009 | Yang | H04L 49/90 370/463 |
| 2010/0014526 A1* | 1/2010 | Chavan | H04L 49/35 370/395.53 |
| 2010/0131636 A1* | 5/2010 | Suri | H04L 45/00 709/224 |
| 2010/0257269 A1* | 10/2010 | Clark | G06F 9/4856 709/226 |
| 2010/0274890 A1* | 10/2010 | Patel | G06F 9/4862 709/224 |
| 2010/0287262 A1* | 11/2010 | Elzur | H04L 41/5054 709/220 |
| 2010/0303075 A1* | 12/2010 | Tripathi | G06F 13/385 370/392 |
| 2011/0035498 A1* | 2/2011 | Shah | H04L 12/12 709/226 |
| 2011/0135303 A1* | 6/2011 | Hufferd | H04L 49/00 398/45 |
| 2011/0261686 A1* | 10/2011 | Kotha | H04L 12/6418 370/230 |
| 2012/0155469 A1* | 6/2012 | Majumdar | H04L 45/26 370/392 |
| 2012/0250511 A1* | 10/2012 | Neeser | H04L 47/12 370/235 |
| 2013/0028135 A1* | 1/2013 | Berman | H04L 12/4625 370/254 |
| 2013/0163419 A1* | 6/2013 | Armstrong | H04L 12/4641 370/230 |
| 2013/0254766 A1* | 9/2013 | Zuo | H04L 47/20 718/1 |
| 2013/0346531 A1* | 12/2013 | Hummel | G06F 13/4022 709/212 |
| 2014/0059537 A1* | 2/2014 | Kamble | G06F 9/45558 718/1 |
| 2015/0006705 A1* | 1/2015 | Antony | H04L 43/0882 709/224 |

OTHER PUBLICATIONS

Wadekar, "Priority Grouping for DCB Networks", Data Center Bridging, Rev. 1.01, Obtained from Internet Jun. 20, 2013, 9 pgs.

Cisco, "Priority Flow Control: Build Reliable Layer 2 Infrastructure", IEEE 802.1, Data Center Bridging, Obtained from Internet Jun. 10, 2013, 10 pgs.

Barrass, "Proposal for Priority Based Flow Control", Data Center Bridging, May 8, 2008, 9 pgs.

Wikipedia, "Data Center Bridging", page last modified on May 20, 2013, 4 pgs.

Wikipedia, "Ethernet Flow Control", page last modified on Mar. 22, 2013, 4 pgs.

Dell, Broadcom, "Switch Independent Partitioning FAQs", 57712-K/578xxS, May 2, 2012, 26 pgs.

Sundaram et al. "System and Method for Link Aggregation Group Hashing Using Flow Control Information", U.S. Appl. No. 13/750,666, filed Jan. 25, 2013, 25 pgs.

Zhang et al., "Systems and Methods for Intelligent System Profile Unique Data Management", U.S. Appl. No. 13/618,666, filed Sep. 14, 2012, 32 pgs.

Frazier et al., "IEEE 802.3ad Link Aggregation (LAG)", IEEE, Apr. 17, 2007, 13 pgs.

Wikipedia, "Link Aggregation", Page last modified Jul. 23, 2013, 10 pgs.

\* cited by examiner

SYSTEMS AND METHODS FOR NATIVE NETWORK INTERFACE CONTROLLER (NIC) TEAMING LOAD BALANCING

FIELD OF THE INVENTION

This invention relates generally to information handling systems and, more particularly, to load balancing for NIC teaming applications.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

FIG. 1 illustrates a conventional converged network environment 100 in which two storage arrays 102a and 102b are accessed by an information handling system 110 that is configured as a server having two converged network interface controllers (C-NICs), also known as converged network adapters (CNAs). As shown, the two CNAs of the server 110 access the storage arrays 102a and 102b using data center bridging exchange (DCB) protocols 106a and 106b and respective top-of-rack (ToR) fibre channel forwarder (FCF) switches 104a and 104b across respective data paths 108a and 108b. In FIG. 1, server 110 executes a Windows Server® (WS) 2012 operating system that includes built-in capability for network interface controller (NIC) teaming to provide fault tolerance on network adapters, and this NIC Teaming also allows the aggregation of bandwidth from multiple CNAs by providing several different ways to distribute outbound traffic between the CNAs. In this regard, network traffic can be spread according to a hash of the source and destination addresses and ports (IP hashing), or it can be spread according to the originating port for virtual machines. Specifically, conventional NIC Teaming has two modes of configurations:

Switch-independent modes. These algorithms make it possible for team members to connect to different switches because the switch doesn't know that the interface is part of a NIC team at the host. These modes do not require the switch to participate in the NIC teaming.

Switch-dependent modes. These algorithms require the switch to participate in the NIC teaming. Here, all interfaces of the team are connected to the same switch.

In the conventional network environment 100 of FIG. 1, scenarios can exist where a hypervisor (Hyper-V®) enabled WS 2012 server 110 has two converged network adapters (CNA) allowing LAN and SAN traffic on the same CNA, with each NIC being connected to a respective different network switch 104a or 104b, and with all the components (server 110, storage 102 and network switches 104) supporting IEEE 802.1-based Data Center Bridging (DCB) standards (which may include Priority-based Flow Control "PFC", Enhanced Transmission Selection "ETS", Data Center Bridging eXchange "DCBX"). In such a scenario, switch-dependent NIC teaming mode will not work as each CNA is connected to a different switch. If switch-independent NIC teaming is enabled using one of the available load balancing mode algorithms such as "Hyper-V Port" as illustrated by GUI 200 of FIG. 2, traffic is load balanced based on source virtual port ID associated with a virtual machine (VM).

However, if one VM starts generating a large amount of LAN traffic, traffic will pass through only one physical NIC of the Hyper-V® enabled host 110, which can choke one heavily utilized data path 108b to one switch 104b as shown. Even with a selected IP hash option, the evenness of traffic distribution depends on the number of TCP/IP sessions to unique destinations, and there is no benefit for bulk transfer between a single pair of hosts. In such a case, when DCB-enabled switch 104b detects congestion on queue for a specified priority, it starts sending priority flow control (PFC) pause frames 109 for the 802.1p traffic across the heavily-utilized data path 108b to the sending DCB-enabled WS 2012 server 110 as shown to ensure lossless flow for storage traffic by instructing the server 110 to stop sending the specific type of storage traffic that is causing the detected congestion. In this way, the PFC pause frames 109 are used to ensure that large amounts of queued LAN traffic do not cause storage traffic to be dropped However, at the same time a second NIC of the server 110 that is transmitting data to the other switch 102a remains less utilized.

SUMMARY OF THE INVENTION

Disclosed herein are systems and methods that may be employed in a network environment (e.g., converged network environment) to implement load balancing for multi-NIC teaming applications by leveraging pause frame flow control communications received at an information handling system in situations where a given data path through a given NIC of the information handling system and a corresponding network switch is heavily loaded or otherwise congested relative to one or more other more lightly loaded data paths through other NICs of the information handling system and their corresponding network switches. Advantageously, the received flow control communications may be used by the information handing system to make further load balancing decisions between the multiple physical NICs of the system in order to lessen loading of the particular NIC and the corresponding network switch of the more heavily loaded data path by transferring data traffic from these heavily loaded data path components to other unused or more lightly loaded components (i.e., physical NICs and corresponding network switches) of another data path.

The disclosed systems and methods may be employed by to implement load balancing between multiple NICs and corresponding multiple network switches (e.g., that are operating in a switch-independent mode) in any network environment configuration that employs pause frame flow control communications between switches and server/s. In one embodiment, a DCB-enabled server may employ an OS-level process to monitor pause frames currently received by each system NIC and to use this monitoring information to enhance NIC teaming load balancing. In a further embodiment, the DCB-enabled server may monitor the number of received pause frames at each NIC on a periodic basis to determine when the number of received pause frames received at a given NIC exceeds a given threshold (e.g., number of pause frames received during a defined time interval, cumulative pause period specified by the pause frames received during a defined time interval, etc.). Whenever the number of pause frames exceeds the given threshold, the DCB-enabled server may use this information to identify less utilized NIC/s and make further load-balancing decisions between multiple NICs to lessen the data traffic queue on the particular more heavily loaded NIC/s. In one embodiment, these further load-balancing decisions may be made in a manner that augments the load balancing experience on top of other available default load balancing options of a server OS.

In one exemplary embodiment, the disclosed systems and methods may be implemented by a DCB-enabled server that includes multiple NICs coupled by different data paths to respective different DCB-enabled network switches that each include one or more processing device/s configured to transmit PFC pause frames to the server as flow control information. Such a server may be, for example, a WS 2012-based server that includes native DCB support, or may be a server executing any other type of OS where DCB support is present or added (e.g., including other OS such as VMware vSphere® if modified to include support for DCB). In such an exemplary embodiment, the server may be configured to monitor incoming pause frames as PFC pause frames having specific format with unique destination MAC address (01:80:C2:00:00:01) and PFC MAC control opcode (0x0101). With this MAC address and frame identity information, server may differentiate PFC pause frames from other layer-2 frames. The server may also determine through which particular more heavily-loaded NIC the pause frames are being received. Based on the presence and absence of pause frames, the server may be configured to identify which NIC or NICs are more heavily loaded and/or which NIC or NICs are more lightly loaded or less-utilized at any given time (e.g., not sending any pause frames). The server may be configured to then implement load balancing based on this information by transferring data traffic from the identified more heavily loaded NIC or NICs to the identified more lightly loaded NIC or NICs, optionally to augment overall load balancing in conjunction with or on top of available default load balancing options such as internet protocol (IP) hashing.

In addition to converged network environments including CNAs that support DCB, it will be understood that the disclosed systems and methods may also be implemented in other types of network environments and/or using types of pause frames other than PFC pause frames. For example, a server may be configured to monitor receipt of IEEE 802.3x Ethernet pause frames in a 1 gigabit (Gb) network configuration (non-converged infrastructure), and to determine in any suitable manner which NIC or NICs the Ethernet pause frames are being received. For example, a server may be configured to identify pause frames and the specific NICs through which they are being received from destination address information and/or by using pause frame identification information included in each Ethernet pause frame or other type of pause frame. In such an embodiment, the server may be further configured to dynamically improve NIC teaming load balancing based on a real time determination of which NIC or NICs the Ethernet pause frames are being received by transferring data traffic from identified more heavily loaded NIC or NICs to identified more lightly loaded NIC or NICs.

In one respect, disclosed is an information handling system, including: at least two network interface controllers (NICs), each of the two NICs being configured to be coupled to a respective different network switch by a respective different data path such that each of the two NICs exchanges data traffic with only one of the respective different network switches and not with the other one of the respective different network switches; and at least one host processing device configured to execute a hypervisor and multiple virtual machines (VMs) to exchange VM data traffic with each of the respective different network switches, the host processing device being configured to selectively route VM data traffic between each of the multiple VMs and each given one of the multiple NICs. The at least one host processing device may be further configured to: monitor flow control information in the form of pause frames currently received at a given NIC from a respective one of the network switches across a respective data path corresponding to the given network switch; select one of the multiple NICs based on the monitored flow control information; and route VM data traffic from at least one of the multiple VMs to the selected one of the multiple NICs.

In another respect, disclosed herein is a method of load balancing data traffic among multiple network interface controllers (NICs) of an information handling system. The method may include: executing a hypervisor and multiple virtual machines (VMs) on at least one host processing device of an information handling system that includes at least two NICs that are each coupled to a respective different network switch by a respective different data path such that each of the two NICs exchanges data traffic with only one of the respective different network switches and not with the other one of the respective different network switches. The method may also include using the host processing device to: selectively route VM data traffic between each of the multiple VMs and each given one of the multiple NICs, monitor flow control information in the form of pause frames currently received at a given NIC from a respective one of the network switches across a respective data path corresponding to the given network switch, select one of the multiple NICs based on the monitored flow control information, and route VM data traffic from at least one of the multiple VMs to the selected one of the multiple NICs.

DESCRIPTION OF ILLUSTRATIVE EMBODIMENTS

Figure 1:
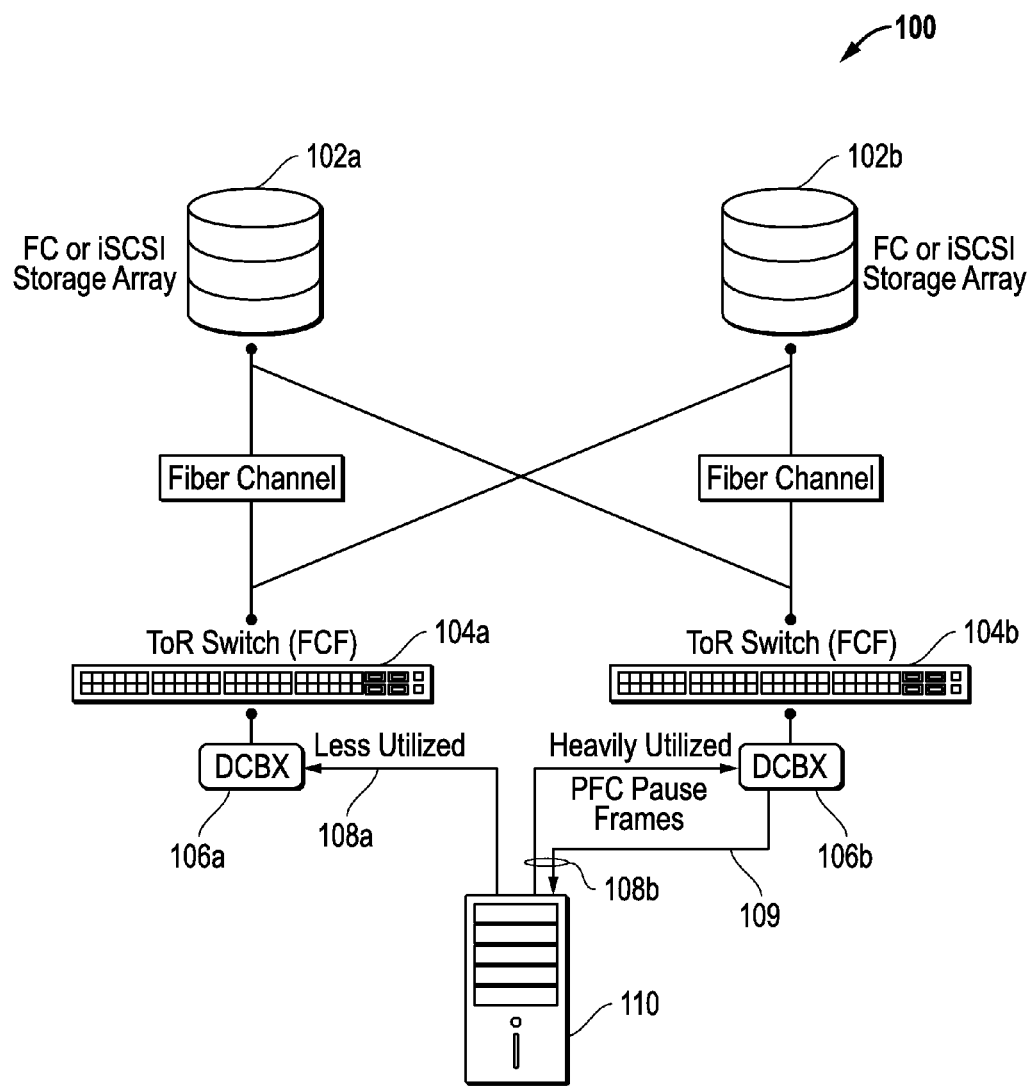
FIG. 1 illustrates a conventional converged network environment.
Figure 2:
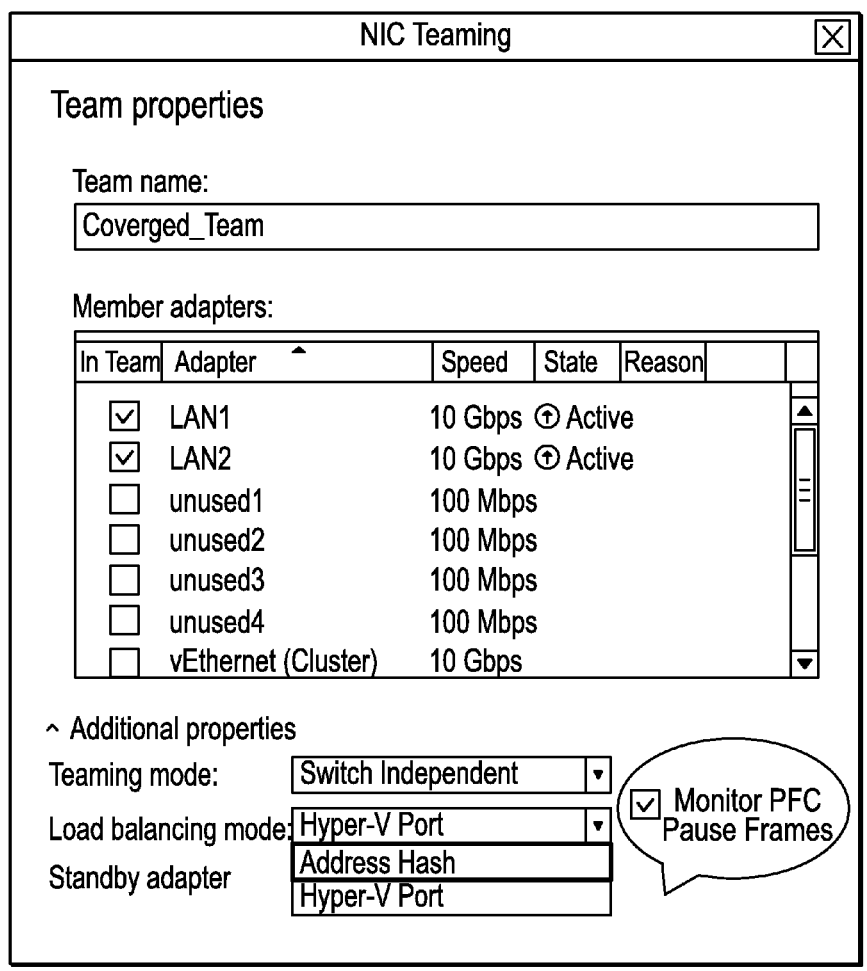
FIG. 2 illustrates a conventional graphical user interface (GUI) for NIC teaming.
Figure 3:
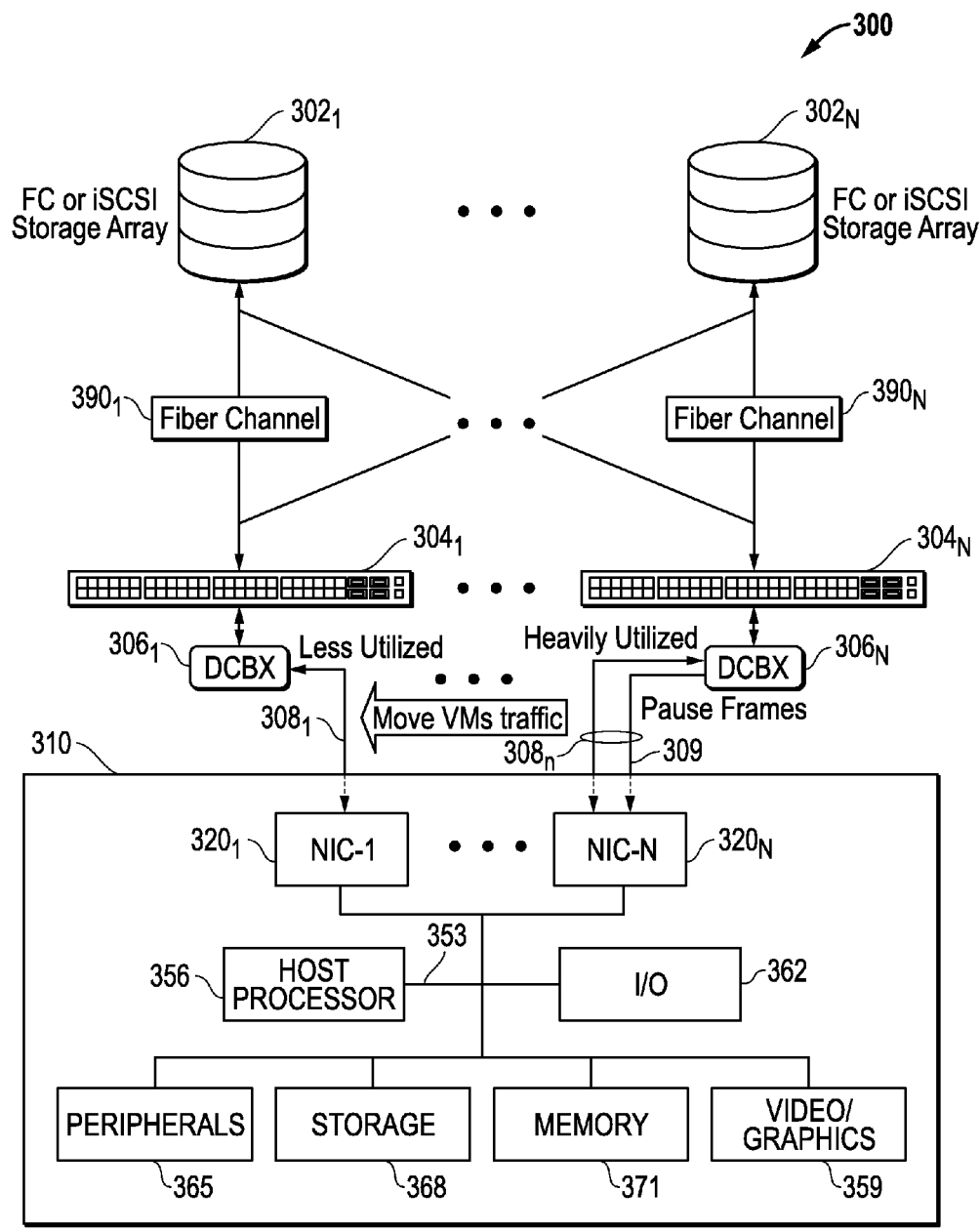
FIG. 3 illustrates a network environment according to one exemplary embodiment of the disclosed systems and methods.

FIG. 3 illustrates one exemplary embodiment of a converged network environment 300 in which two or more storage arrays $302_1$ to $302_N$ are accessed by an information handling system 310 that is configured as a server having a team of network interfaces implemented by two or more NICs $320_1$ to $320_N$, e.g., which may be converged network adapters (CNAs) or other suitable NIC configuration. As shown, the NICs $320_1$ to $320_N$ of the server 310 are configured to access the storage arrays $302_1$ to $302_N$ through Fibre Channel paths $390_1$ to $390_N$ using data center bridging exchange (DCB) protocols $306_1$ to $306_N$ and respective network switches $304_1$ to $304_N$ across respective two or more data paths $308_1$ to $308_N$. Examples of DCB standards that may be employed in the practice of the disclosed systems and methods include, for example, PFC, ETS, DCBX, etc. Network switches may be, for example, top-of-rack (ToR) fibre channel forwarder (FCF) switches, or any other suitable network switch configuration. It will be understood that the number of multiple network switches 304 may or may not be the same as the number of multiple NICs 320, and that although multiple storage arrays 302 are illustrated, it is also possible that multiple switches 304 may communicate with a single storage array 302 and/or with other types of devices (e.g., storage devices, memory devices, processing devices, etc.) via multiple switches 304.

Still referring to the exemplary embodiment of FIG. 3, system 310 may include one or more host processing devices, one or more buses or communication media 353, video/graphics hardware 359, storage 368, memory 371, input/output (I/O) 362 and peripherals 365. In this embodiment, bus 353 provides a mechanism for the various components of system 310 to communicate and couple with one another. In-band processor 356 may include a Host processor (e.g., CPU) running a host operating system (OS) for system 310 such as Windows Server® (WS) 2012, VMware vSphere®, or any other operating system that is enabled to receive and process flow control information in the form of pause frames (e.g., such as PFC frames) in a manner as will be described further herein. Video/graphics 359, storage 368, memory 371, I/O 362 and peripherals 365 may have the structure, and perform the functions known to those of skill in the art. Besides memory 371 (e.g., RAM), processor 356 may include cache memory for storage of frequently accessed data, and storage 368 may include extended memory for processor 356.

It will be understood that the embodiment of FIG. 3 is exemplary only, and that an information handling system may be provided with one or more processing devices that may perform the functions of processor 356, as well as other optional processing devices to perform the operations of information handling system 310. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 3 is exemplary only, and that other information handling system architectures may be employed in the practice of the disclosed systems and methods that are suitable for performing the load balancing tasks described herein for multi-NIC teaming applications, e.g., system architectures those having one or more different components and/or fewer or greater number of system components.

In the exemplary embodiment of FIG. 3, multiple virtual machines (VMs) may be executing on a hypervisor (e.g., Hyper-V® or other type hypervisor) of server 310, and each of at least two of the multiple NICs 320 may be coupled to a respective different network switch 304 such that data traffic output by each of the two NICs 320 is only be transmitted to one of the respective different network switches 304 and not the other, i.e., NIC $320_1$ coupled to transmit data only to switch $304_1$ across data path $308_1$ and NIC $320_N$ coupled to transmit data only to switch $304_1$ across data path $308_N$. Data paths 308 may be a local area network (LAN) data path with quality of service (QoS) capability such as 802.1p, 802.1q etc. As previously described, in such a configuration, conventional switch-dependent NIC teaming mode will not work for these at least two NICs since each of these two NICs 320 is connected to a different switch 304. Further information on example hypervisor and virtual machine configurations may be found in U.S. patent application Ser. No. 13/618,666 filed Sep. 14, 2012, which is incorporated herein by reference in its entirety.

Still referring to FIG. 3, one or more VM's assigned to NIC $320_N$ are generating much greater local area network (LAN) traffic at a given priority through data path $308_N$ and physical NIC $320_N$ than is being generated through data path $308_1$ and physical NIC $320_1$ such that data handling capacity of switch $304_N$ is exceeded, while data handling capacity of switch $304_1$ is not exceeded. When switch $304_N$ detects congestion on the queue for the specified priority, it responds by transmitting priority flow control (PFC) pause frames 309 for the data traffic across the heavily-utilized data path 308b back to the sending DCBX-enabled server 310 as shown such as are conventionally employed to instruct server 310 to stop sending the specific type of storage traffic that is causing the detected congestion.

Figure 7:
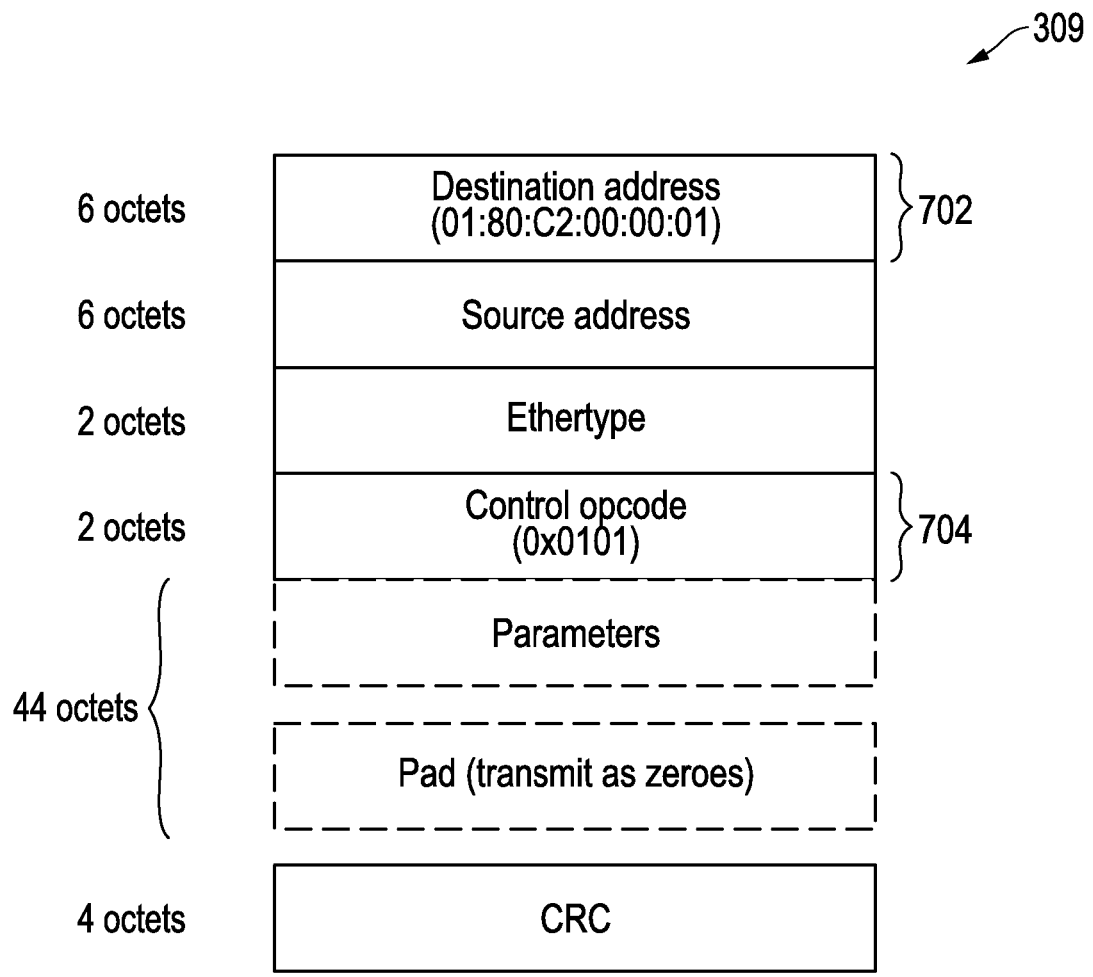
FIG. 7 illustrates a PFC pause frame according to one exemplary embodiment of the disclosed systems and methods.

However, in this embodiment of the disclosed systems and methods, a host OS executing on host processor 356 may be configured to additionally or alternatively process and monitor the received DCBX PFC frames 309. Referring to FIG. 7, each of the 802.1Qbb PFC frames 309 are received with a unique destination MAC address (01:80:C2: 00:00:01) 702 that identifies a destination NIC 320, and MAC control opcode (0x0101) 704 that identifies the frame 309 as a PFC pause frame. With this information, server 310 identifies received pause frames 309 from their MAC control opcode. The server 310 may determine through which one or more NICs 320 the pause frames 309 are currently being received by server 310 at the OS level when the host OS confirms that a PFC pause frame 309 is received/identified by the destination MAC destination address, MAC control opcode, etc. In this regard, the host OS may note from which NIC 320 the OS has received each PFC pause frame 309 and consequently mark that particular NIC 320 as being loaded. This may be accomplished in any suitable fashion, for example, by extracting destination MAC address from received pause frames 309 to determine clearly through which NIC 320 the pause frames 309 are being received. It will also be understood that NIC identification may be alternatively or additionally handled at the NIC level, e.g., a NIC 320 that receives a PFC pause frame 309 may announce itself as heavily loaded to the host OS of server 310 when the NIC 320 receives a PFC pause frame 309. In any case, server 310 may so identify which, if any, one or more NICs 320 are currently overloaded or otherwise more heavily loaded with data traffic relative to other available NICs 320 of server 310. This monitored pause frame information may then be used to make further load balancing decisions in order to lessen loading a particular NIC and respective data path queue, such as to transfer some of the VM data traffic from a more heavily used or overloaded physical NIC 320 and its respective data path 308 to at least one unused or more lightly used physical NIC 320 and its respective data path 308.

For example, in the illustrated embodiment of FIG. 3, switch $306_N$ is shown currently sending pause frames 309 to server 310 through data path $308_N$ while switch $306_1$ is currently sending no pause frames 309 through data path $308_1$, indicating that NIC $320_N$ and its associated data path $308_N$ and switch $306_N$ are currently heavily utilized relative to NIC $320_1$ and its associated data path $308_1$ and switch $306_1$. In response to determination of the existence of such a current data traffic imbalance between NICs 320, the OS executing on host processing device 356 may transfer at least some of the current VM data traffic from the more heavily used or overloaded physical NIC $320_N$ and its respective data path $308_N$ to the more lightly used physical NIC $320_1$ and its respective data path $308_1$ as shown by the arrow in FIG. 3. The OS executing on host processing device 356 may then continue to continuously (or at least periodically) monitor the real time data traffic balance between the multiple NICs 320, and transfer traffic back and forth in real time between the available NICs 320 from those NICs 320 having a greater current traffic load (i.e., NICs 320 receiving a relatively greater number of pause frames from a corresponding switch) to those NICs 320 having a lesser current traffic load (i.e., NICs 320 receiving a relatively lesser number of pause frames from a corresponding switch) as appropriate to more evenly distributed VM traffic between the multiple NICs 320 when imbalances in data traffic between the NICs 320 is detected. The load transfer of this load balancing operation may be in addition to, may augment, or may alter, the default conventional load-balancing techniques that may also be implemented by the OS (e.g., spreading traffic from a VM to NICs 320 and data paths 308 according to an IP hash of the source and/or destination addresses and ports, VM traffic equally distributed between multiple physical NICs 320 and data paths 308, etc.).

It will be understood that data traffic may be transferred from one or more heavily loaded NICs 320 to one or more lighter loaded NICs 320 using any desired protocol that is suitable for more evenly distributing VM data traffic among multiple NICs 320. For example, in one exemplary embodiment where only one NIC $320_N$ is currently receiving pause frames 309 from across its respective data path $308_N$, then excess VM data traffic from NIC $320_N$ may be equally divided and transferred to the other multiple NICs $320_1$ to $320_{N-1}$ that are not currently receiving pause frames 309. In another exemplary embodiment where multiple NICs $320_N$ are currently receiving pause frames 309 from across their respective data paths 308, then some portion of the data traffic from each of the multiple NICs $320_N$ currently receiving pause frames 309 may be transferred to any one or more of the remaining NICs 320 that are not currently receiving pause frames (e.g., equally distributed among the NICs 320 that are not currently receiving pause frames). Alternatively, where multiple NICs $320_N$ are currently receiving pause frames 309 from across their respective data paths 308, then number of pause frames currently received in a given time period by each NIC 320 may be compared to the number of pause frames currently received in the same given time period by other NICs 320, and data traffic from one or more NICs $320_N$ currently receiving the most pause frames 309 in the given time period may be transferred to one or more NICs $320_N$ currently receiving a lesser number of pause frames 309 in the same given time frame. The foregoing embodiments are exemplary only, and any other protocol may be employed that is suitable for more evenly distributing VM data traffic among multiple NICs 320.

In a further embodiment, the OS executing on host processing device 356 may be configured to transfer traffic from one or more heavily loaded NICs 320 only when data traffic through each given more heavily load NIC 320 exceeds a pre-determined threshold. For example. the OS may monitor the number of pause frames 309 received through a given NIC 320 periodically (e.g., during a defined time period) by the OS executing on host processing device 356 to determine when the number of PFC pause frames received through the given NIC 320 reaches a pre-determined data transfer threshold (e.g., such as a threshold minimum number of received pause frames received during a defined time period within the defined time interval through the given NIC 320, or a threshold minimum cumulative pause period specified by the pause frames received during the defined time interval through the given NIC 320). When this data transfer threshold is exceeded by the given NIC 320, then at least a portion of the VM data traffic currently routed through the given NIC 320 may be transferred to one or more available NICs 320 that do not currently have a traffic load that exceeds the pre-determined threshold, or otherwise transferred according to any other suitable protocol as described elsewhere herein. It will be understood that a particular value of pre-determined data transfer threshold may be determined and customized to fit a given NIC teaming system configuration based on the particular system components, desired system performance, empirical system performance testing, or a combination thereof.

Figure 4:
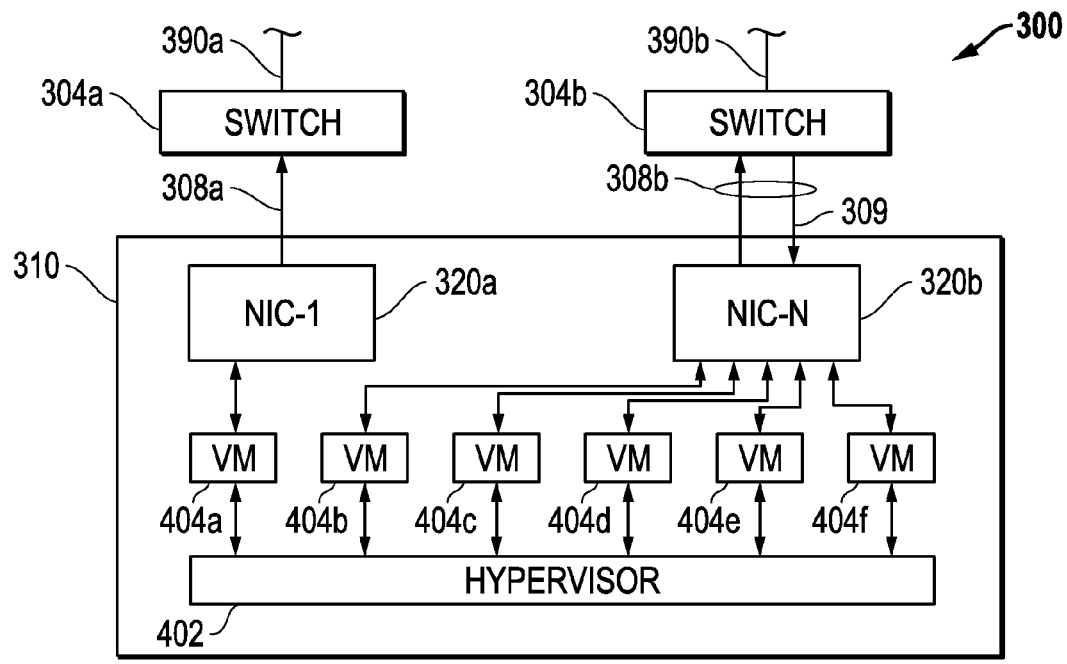
FIG. 4 illustrates a network environment according to one exemplary embodiment of the disclosed systems and methods.
Figure 5:
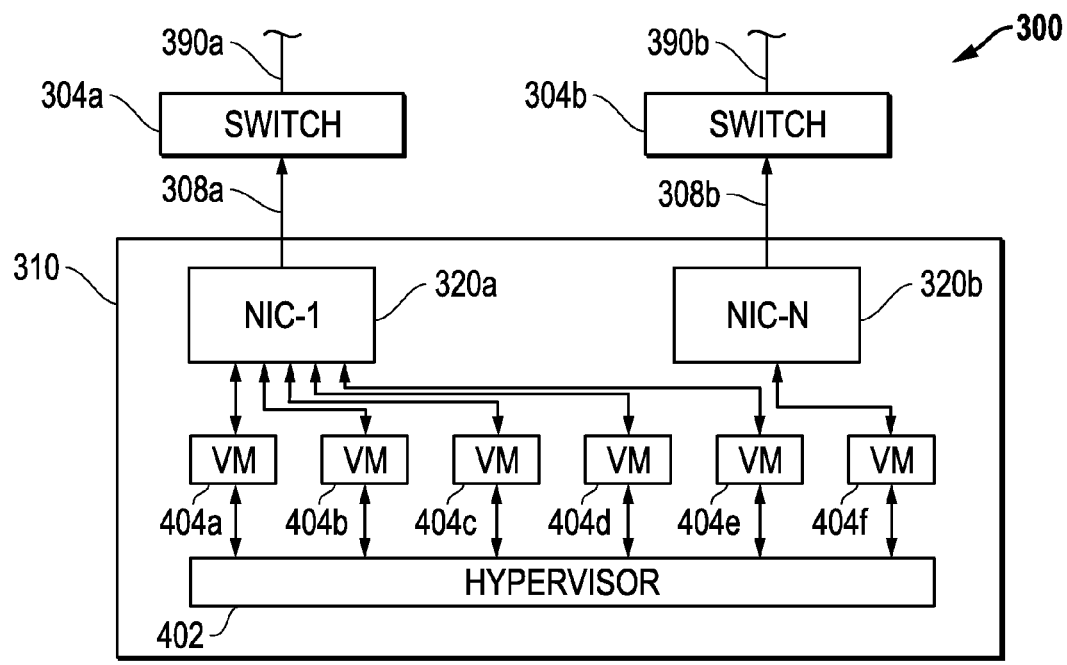
FIG. 5 illustrates a network environment according to one exemplary embodiment of the disclosed systems and methods.

FIG. 4 illustrates a server 310 upon which six virtual machines (VMs) 404a to 404f and a hypervisor 402 are executing and communicating data with two network switches 304a and 304b via respective NICs 320a and 320b and corresponding data paths 308a and 308b. As shown in FIG. 4, traffic from each of five VMs 404b to 404f is currently being routed to switch 304b via NIC 320b, while traffic from only one VM 404a is currently being routed to switch 304a via NIC 320a. As also shown in FIG. 4, pause frames 309 are being sent from switch 304b to NIC 320b, indicating that data traffic through switch 304b is congested. FIG. 5 illustrates server 310 of FIG. 4 after server 310 has used the received pause frames 309 to identify NIC 320a as being more lightly loaded, and has used this information to determine to transfer data traffic from (VMs) 404b, 404c, 404d and 404e to NIC 320a. In FIG. 5, no pause frames are currently being received by either NIC 320a or 320b of server 310, indicating that no NICs 320 are currently overloaded. In the condition of FIG. 5, server 310 will maintain the current data traffic pattern from VMs 404 to NICs 320, but will continue monitoring for receipt of pause frames 309, at which time server 310 may again transfer data traffic from one or more VMs 404 to a different NIC 320 as appropriate to achieve further load-balancing and more equal traffic distribution between the multiple NICs 320.

Figure 6:
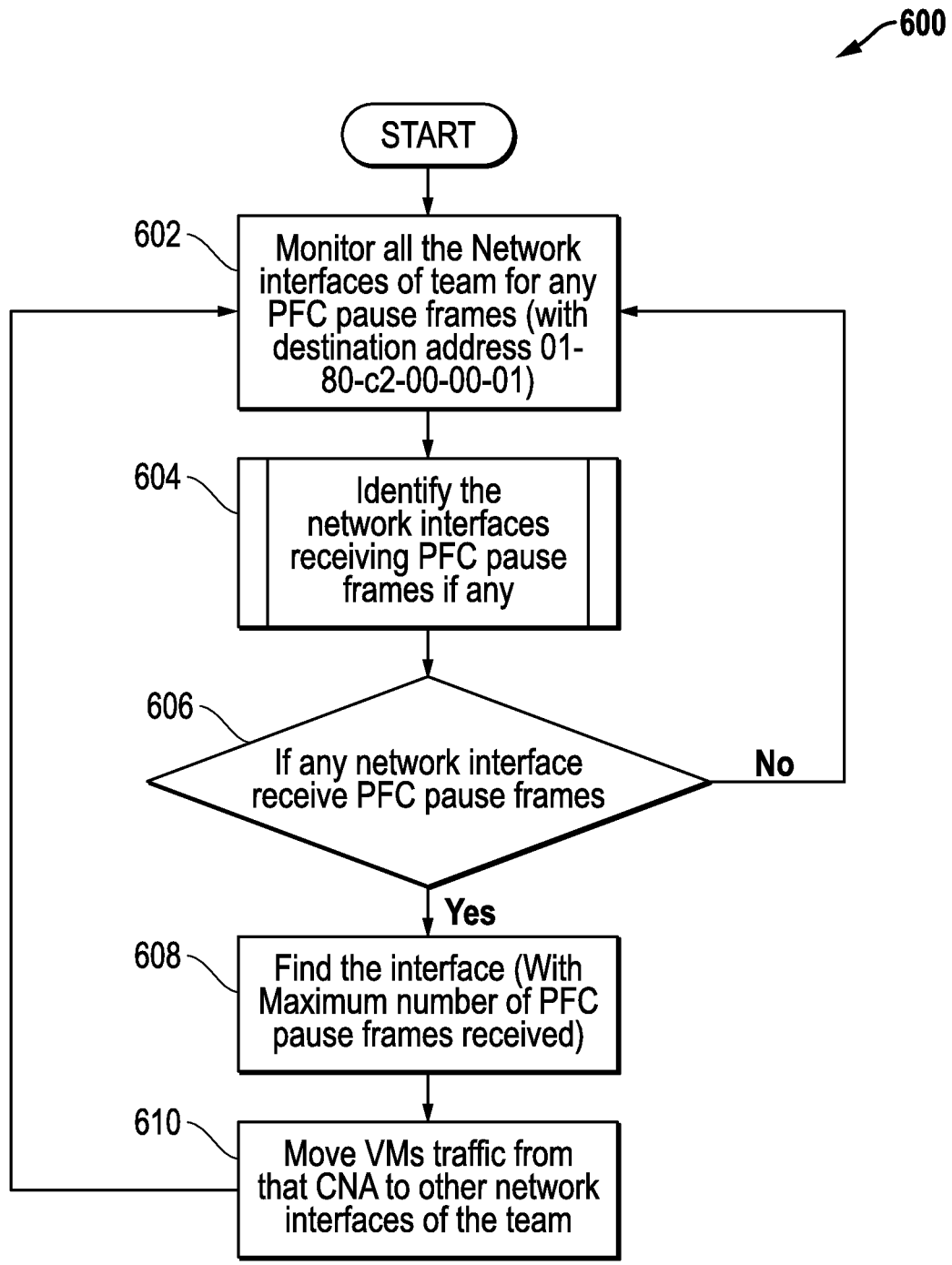
FIG. 6 illustrates methodology according to one exemplary embodiment of the disclosed systems and methods.

FIG. 6 illustrates one exemplary embodiment of methodology 600 that may be implemented, e.g., by OS executing on host processing device 356 of server 310. As shown, methodology 600 starts in step 602 where all network interfaces of a NIC team (e.g., NICs $320_1$ to $320_N$ of FIG. 3) are monitored for the presence of any received PFC or other type of pause frames with a destination address. The PFC pause frames are destined with unique destination MAC address and unique MAC control opcode. The MAC control opcode information may be used by server 310 to identify/differentiate PFC frames from other layer-2 frames. With this information, server 310 may also monitor on which network interface particular PFC frames are received based on the destination MAC address. Next, in step 604, all network interface controllers (NICs) currently receiving pause frames are identified. If no network interfaces (NICs) are found to be receiving pause frames in step 606 then methodology 600 repeats to step 602 as shown. However, if any one or more network interfaces (NICs) are found to be heavily loaded and currently receiving pause frames, then methodology 600 proceeds from step 606 to step 608, where the network interface (NIC) currently receiving the maximum number (or rate) of pause frames is identified. Then in step 610, data traffic of one or more VMs is moved from the heavily loaded NIC to one or more other network interfaces (NICs) of the team (preferentially to one or more other capacity-available NICs not currently receiving pause frames). Methodology 600 then repeats to step 602 and OS of server 310 continues to monitor NIC teaming load distribution on a real time basis.

With regard to step 610 of methodology 600, any suitable load balancing protocol may be followed to more evenly distribute VM traffic among the multiple NIC team members, and/or to achieve a reduction in the maximum pause frame rate received by the most heavily loaded NIC team member at any given time. For example, data traffic from a sufficient number of VMs may be moved such that the heavily loaded NIC no longer receives pause frames, if other NICs not currently receiving pause frames are available to take on the capacity off additional VM traffic without becoming heavily loaded themselves. Where multiple other capacity-available NICs are currently receiving no pause frames, then VM data traffic of one VM may be moved from a heavily loaded NIC to one of the capacity-available NICs selected by random or default, and VM traffic of multiple VMs may be moved and divided amongst the other capacity-available NICs. Where no other NICs are not currently receiving pause frames, then no action may be taken (no VM traffic moved between the NIC team members). Alternatively, VM traffic may be moved from a heavily loaded NIC to another less heavily loaded NIC that is also currently receiving pause frames.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
multiple physical network interface controllers (NICs), each of the multiple physical NICs being configured to be coupled to a respective different network switch by a respective different data path such that each of the multiple physical NICs exchanges data traffic with only one of the respective different network switches and not with the other one of the respective different network switches; and
at least one host processing device coupled to the physical NICs with the physical NICs being configured to be coupled between the host processing device and the network switches, the host processing device being configured to execute a hypervisor and multiple virtual machines (VMs) to exchange VM data traffic with each given one of the respective different network switches through a corresponding one of the physical NICs, the host processing device being configured to selectively route VM data traffic between each of the multiple VMs and each given one of the multiple physical NICs;
where the at least one host processing device is further configured to:
monitor flow control information in the form of pause frames currently received at a given physical NIC from a respective one of the network switches across a respective data path corresponding to the given network switch,
select at least a first one of the multiple physical NICs based on the pause frames of the monitored flow control information, and
transfer a destination for VM data traffic of at least one of the multiple VMs from at least one second and different one of the physical NICs to the selected first one of the multiple physical NICs based on the monitored flow control information; and
where the information handling system is a single server that includes each of the multiple physical NICs and the at least one host processing device inside the server, each of the two physical NICs being configured to be coupled to a respective different network switch outside the server.

2. The information handling system of claim 1, where the at least one host processing device is further configured to select one of the multiple physical NICs that is not currently receiving any pause frames; and then to transfer a destination for VM data traffic of at least one of the multiple VMs from at least one second and different one of the physical NICs to the selected first one of the multiple physical NICs.

3. The information handling system of claim 1, where the at least one host processing device is further configured to:
identify at least one of the multiple physical NICs that is not currently receiving any pause frames;
identify at least one of the multiple physical NICs that is currently receiving both pause frames and VM data traffic from one or more VMs; and
then transfer a destination for at least a portion of the VM data traffic from the physical NIC that is currently receiving pause frames to the physical NIC that is not currently receiving pause frames.

4. The information handling system of claim 1, where the at least one host processing device is further configured to:
determine the relative number of pause frames currently received at each of the multiple physical NICs during a given time period; and
then transfer a destination for at least a portion of the VM data traffic from a physical NIC that is currently receiving a relatively greater number of pause frames to a physical NIC that is currently receiving relatively lesser number of pause frames.

5. The information handling system of claim 1, where the at least one host processing device is further configured to:
determine the relative number of pause frames currently received at each of the multiple physical NICs during a given time period;
determine a given one of the multiple physical NICs that is currently receiving a greatest number of pause frames of any of the multiple physical NICs during a given time period; and
then transfer a destination for at least a portion of the VM data traffic from the physical NIC that is currently receiving a greatest number of pause frames of any of the multiple physical NICs during a given time period to at least one other of the multiple physical NICs that is currently receiving relatively a lesser number of pause frames during the given time period.

6. The information handling system of claim 1, where the at least one host processing device is further configured to:
monitor the number of pause frames currently received at each physical NIC on a periodic basis to determine when the number of pause frames currently received at a given physical NIC exceeds a given pause frame threshold or when the number of pause frames currently received at a given physical NIC specifies a cumulative pause period that exceeds a given pause period threshold; and
then transfer a destination for at least a portion of the VM data traffic from a physical NIC that is currently exceeding the given pause frame threshold or that is currently exceeding the given pause period threshold to a physical NIC that is not currently exceeding either of the given pause frame threshold or the given pause period threshold.

7. The information handling system of claim 1, where the at least one host processing device is further configured to monitor incoming pause frames and extract the sender media access control (MAC) address from the pause frames to determine through which particular physical NIC each of the given pause frames is being received.

8. The information handling system of claim 1, where the at least one host processing device is further configured to:
use the monitored flow control information to identify at least one of the multiple physical NICs that is currently more heavily loaded with VM data traffic than at least one other of the multiple physical NICs that is currently more lightly loaded with VM data traffic; and
then implement load balancing by transferring a destination for VM data traffic from the identified more heavily loaded NIC to the identified more lightly loaded physical NIC.

9. The information handling system of claim 1, where the at least one host processing device is further configured to spread VM data traffic from the multiple VMs to the multiple according to an internet protocol (IP) hash of the source and/or destination addresses and ports, equally distribute VM data traffic between the multiple physical NICs, or a combination thereof.

10. The information handling system of claim 1, where the multiple physical NICs are each configured to be coupled to multiple storage arrays by a respective different one of the multiple network switches; where each of the multiple switches is configured to detect data traffic congestion on a queue for a specified priority; and where each given one of the multiple network switches is configured to send the flow control information to the respective coupled physical NIC in the form of priority flow control (PFC) pause frames when the given network switch detects congestion on the queue for the specified priority.

11. The information handling system of claim 1, where each of the physical NICs is a converged network adapter (CNA) that is configured to be coupled between the host processing device and a single given network switch that is a top-of-rack (ToR) fibre channel forwarder (FCF) switch, with each of the physical NIC s being coupled to exchange data with only a single one of the respective different network switches and not to exchange data traffic with any other one of the respective different network switches.

12. The information handling system of claim 11, where the at least one host processing device coupled to the physical NICs is a single host processing device coupled to the multiple NICs where each of the CNAs is configured to be coupled to exchange data with only one of the respective different network switches through the single network switch using a data center bridging (DCB) protocol.

13. The information handling system of claim 1, where each of the physical NICs is configured to announce itself as heavily loaded to the host processing device when the physical NIC receives a PFC pause frame from a network switch.

14. A method of load balancing data traffic among multiple physical network interface controllers (NICs) of an information handling system, the method comprising:
providing the information handling system as a single server coupled to a network that is outside the server, the server including at least one host processing device and the multiple physical NICs inside the server, the host processing device being coupled to the physical NICs with the physical NICs being coupled between the host processing device and multiple network switches of the network with each of the physical NICS being coupled to a respective different network switch by a respective different data path;
using the host processing device to execute a hypervisor and multiple virtual machines (VMs) to exchange VM data traffic with each given one of the respective different network switches through a corresponding one of the physical NICs, and using the host processing device to selectively route VM data traffic between each of the multiple VMs and each given one of the multiple physical NICs;

executing the hypervisor and multiple virtual machines (VMs) on the at least one host processing device inside the server and causing each of the multiple physical NICs inside the server to exchange data traffic with only one of the respective different network switches outside the server and not with any other one of the respective different network switches outside the server with the physical NICs being coupled between the host processing device and the network switches such that the multiple virtual machines (VMs) exchange VM data traffic with each given one of the respective different network switches through a corresponding one of the physical NICs; and using the host processing device to:
 selectively route VM data traffic between each of the multiple VMs and each given one of the multiple physical NICs,
 monitor flow control information in the form of pause frames currently received at a given physical NIC from a respective one of the network switches across a respective data path corresponding to the given network switch,
 select at least a first one of the multiple physical NICs based on the pause frames of the monitored flow control information, and
 transfer a destination for VM data traffic of at least one of the multiple VMs from at least one second and different one of the physical NICs to the selected first one of the multiple physical NICs based on the monitored flow control information.

15. The method of claim 14, further comprising using the at least one host processing device to select one of the multiple physical NICs that is not currently receiving any pause frames; and then to transfer a destination for VM data traffic of at least one of the multiple VMs from at least one second and different one of the physical NICs to the selected first one of the multiple physical NICs.

16. The method of claim 14, further comprising using the at least one host processing device to:
 identify at least one of the multiple physical NICs that is not currently receiving any pause frames;
 identify at least one of the multiple physical NICs that is currently receiving both pause frames and VM data traffic from one or more VMs; and
 then transfer a destination for at least a portion of the VM data traffic from the physical NIC that is currently receiving pause frames to the physical NIC that is not currently receiving pause frames.

17. The method of claim 14, further comprising using the at least one host processing device to:
 determine the relative number of pause frames currently received at each of the multiple physical NICs during a given time period; and
 then transfer a destination for at least a portion of the VM data traffic from a physical NIC that is currently receiving a relatively greater number of pause frames to a physical NIC that is currently receiving relatively lesser number of pause frames.

18. The method of claim 14, further comprising using the at least one host processing device to:
 determine the relative number of pause frames currently received at each of the multiple physical NICs during a given time period;

determine a given one of the multiple physical NICs that is currently receiving a greatest number of pause frames of any of the multiple physical NICs during a given time period; and
 then transfer a destination for at least a portion of the VM data traffic from the physical NIC that is currently receiving a greatest number of pause frames of any of the multiple physical NICs during a given time period to at least one other of the multiple physical NICs that is currently receiving relatively a lesser number of pause frames during the given time period.

19. The method of claim 14, further comprising using the at least one host processing device to:
 monitor the number of pause frames currently received at each physical NIC on a periodic basis to determine when the number of pause frames currently received at a given physical NIC exceeds a given pause frame threshold or when the number of pause frames currently received at a given physical NIC specifies a cumulative pause period that exceeds a given pause period threshold; and
 then transfer a destination for at least a portion of the VM data traffic from a physical NIC that is currently exceeding the given pause frame threshold or that is currently exceeding the given pause period threshold to a physical NIC that is not currently exceeding either of the given pause frame threshold or the given pause period threshold.

20. The method of claim 14, further comprising using the at least one host processing device to monitor incoming pause frames and extract the sender media access control (MAC) address from the pause frames to determine through which particular physical NIC each of the given pause frames is being received.

21. The method of claim 14, further comprising using the at least one host processing device to:
 use the monitored flow control information to identify at least one of the multiple physical NICs that is currently more heavily loaded with VM data traffic than at least one other of the multiple physical NICs that is currently more lightly loaded with VM data traffic; and
 then implement load balancing by transferring a destination for VM data traffic from the identified more heavily loaded NIC to the identified more lightly loaded physical NIC.

22. The method of claim 14, further comprising using the at least one host processing device to spread VM data traffic from the multiple VMs to the multiple according to an internet protocol (IP) hash of the source and/or destination addresses and ports, equally distribute VM data traffic between the multiple physical NIC, or a combination thereof.

23. The method of claim 14, where the multiple physical NICs are each coupled to multiple storage arrays by a respective different one of the multiple network switches; and where the method further comprises:
 using each of the multiple switches to detect data traffic congestion on a queue for a specified priority; and
 using each given one of the multiple network switches to send the flow control information to the respective coupled physical NIC in the form of priority flow control (PFC) pause frames when the given network switch detects congestion on the queue for the specified priority.

24. The method of 14, where the at least one host processing device coupled to the multiple NICs is a single host processing device coupled to the multiple NICs where each of the network switches is coupled between multiple storage arrays and only a single one of the physical NICs; and where the method further comprises using each one of the physical NICs to access the multiple storage arrays through the single network switch using a data center bridging (DCB) protocol.

25. The method of claim 24, where the at least one host processing device coupled to the multiple NICs is a single host processing device coupled to the multiple NICs where each of the network switches is coupled between multiple sotrage arrays and only a single one of the physical NICs; and where the method further comprises using each one of the physical NICs to access the multiple storage arrays through the single network switch using a data center bridging (DCB) protocol.

26. The method of claim 14, where the method further comprises using each one of the physical NICs to announce itself as heavily loaded to the host processing device when the physical NIC receives a PFC pause frame from a network switch.

* * * * *